United States Patent
Lakshmi Narasimha et al.

(10) Patent No.: US 11,705,834 B2
(45) Date of Patent: Jul. 18, 2023

(54) SENSORLESS ANGLE ESTIMATION FOR TRAPEZOIDAL CONTROL

(71) Applicant: TEXAS INSTRUMENTS INCORPORATED, Dallas, TX (US)

(72) Inventors: Rajan Lakshmi Narasimha, Dallas, TX (US); David Patrick Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 690 days.

(21) Appl. No.: 16/728,664

(22) Filed: Dec. 27, 2019

(65) Prior Publication Data

US 2021/0203257 A1 Jul. 1, 2021

(51) Int. Cl.
  *H03K 5/00* (2006.01)
  *H02P 6/15* (2016.01)
  *H02P 6/20* (2016.01)

(52) U.S. Cl.
  CPC ............... *H02P 6/157* (2016.02); *H02P 6/20* (2013.01); *H02P 2209/03* (2013.01); *H02P 2209/07* (2013.01)

(58) Field of Classification Search
  CPC .... H02P 6/183; H02P 6/34; H02P 6/20; H02P 6/157; H02P 2209/07; H02P 2209/03
  USPC .................................................. 318/400.13
  See application file for complete search history.

(56) References Cited

U.S. PATENT DOCUMENTS

| | | |
|---|---|---|
| 5,585,709 A | 12/1996 | Jansen et al. |
| 5,867,004 A | 2/1999 | Drager et al. |
| 5,877,602 A * | 3/1999 | Kondoh ............. H02P 6/085 318/806 |
| 6,492,788 B1 | 12/2002 | Agirman et al. |
| 8,693,220 B2 | 4/2014 | Klodowski et al. |
| 9,270,220 B2 | 2/2016 | Magee et al. |
| 9,305,548 B2 | 4/2016 | Kennewick et al. |
| 9,548,686 B2 | 1/2017 | Magee |
| 9,825,564 B2 | 11/2017 | Magee et al. |
| 9,991,777 B2 | 6/2018 | Lynch et al. |

(Continued)

FOREIGN PATENT DOCUMENTS

| | | |
|---|---|---|
| EP | 0872948 A1 | 10/1998 |
| JP | 2009178019 A | 8/2009 |

OTHER PUBLICATIONS

Matthew J. Corley and Robert D. Lorenz, "Rotor Position and Velocity Estimation for a Salient-Pole Permanent Magnet Synchronous Machine at Standstill and High Speeds", IEEE Transactions on Industry Applications, vol. 34, No. 4, Jul./Aug. 1998, pp. 784-789.

(Continued)

*Primary Examiner* — Kawing Chan
*Assistant Examiner* — Gabriel Agared
(74) *Attorney, Agent, or Firm* — John R. Pessotto; Frank D. Cimino

(57) ABSTRACT

Systems and methods for sensorless trapezoidal control of brushless DC motors provide effective high-torque startup and low speed operation without the use of Hall effect sensors or encoders during motor operation. The systems and methods also provide the ability to boost signal-to-noise ratio for motor startup and low speed operation via an augmenting supply voltage. Sampling architectures and current-dependent inductance modeling architectures for the control systems are also described.

20 Claims, 10 Drawing Sheets

(56) References Cited

U.S. PATENT DOCUMENTS

| | | | |
|---|---|---|---|
| 9,998,052 B2 | 6/2018 | Shimada et al. | |
| 2007/0040528 A1 | 2/2007 | Tomigashi et al. | |
| 2007/0069675 A1* | 3/2007 | MacKay | H02P 6/182 318/400.21 |
| 2011/0221421 A1 | 9/2011 | Williams | |
| 2011/0309781 A1 | 12/2011 | Tomigashi | |
| 2013/0049715 A1 | 2/2013 | Groom et al. | |
| 2014/0225548 A1 | 8/2014 | Xu et al. | |
| 2014/0327379 A1 | 11/2014 | Yang et al. | |
| 2015/0102794 A1 | 4/2015 | Fan | |
| 2015/0357956 A1 | 12/2015 | Shimada et al. | |
| 2016/0261183 A1* | 9/2016 | Kelly | H02M 3/1563 |
| 2017/0006303 A1 | 1/2017 | Sethuraman et al. | |
| 2018/0069494 A1* | 3/2018 | Schneider | H02P 21/13 |
| 2019/0004577 A1 | 1/2019 | Laur et al. | |
| 2019/0204366 A1 | 7/2019 | Zhou et al. | |
| 2020/0382035 A1* | 12/2020 | Pacha | H02P 21/24 |

OTHER PUBLICATIONS

Ji-Hoon Jang, et al., "Analysis of Permanent-Magnet Machine for Sensorless Control Based on High-Frequency Signal Injection", IEEE Transactions on Industrial Applications, vol. 40, No. 6, Nov./Dec. 2004, pp. 1595-1604.

Limei Wang and Robert D. Lorenz, "Rotor Position Estimation for Permanent Magnet Synchronous Motor Using Saliency-Tracking Self-Sensing Method", Industry Applications Conference, 2000, Oct. 8-12, 2000, Rome, Italy, pp. 445-450.

Patrick L. Jansen and Robert D. Lorenz, "Transducerless Position and Velocity Estimation in Induction and Salient AC Machines", IEEE Transactions on Industry Applications, vol. 31, No. 2, March/Apr. 1995, pp. 240-246.

Patrick Carner, "Increased Integration, Improved Feature Sets and New Software for Motor Control Systems C2000 Piccolo F2805x microcontrollers", whitepaper, Texas Instruments, Inc., Nov. 2012, pp. 1-9.

"Clarke & Park Transforms on the TMS320C2xx", Application Report Literature No. BPRA048, Texas Instruments, Inc., 1997, pp. 1-46.

Bianchi, N. et al. "Effect of Stator and Rotor Saturation on Sensorless Rotor Position Detection." IEEE Transactions an Industry Applications, vol. 49, No. 3, May/Jun. 2013, pp. 1333-1342.

Barcaro, M. et al. "Iron Saturation Impacton High Frequency Sensorless Control of Synchronous Permanent Magnets Motor." 978-1-5090-2538-1 @2016 IEEE, pp. 1085-1091.

Li, Y. et al. "Improved Rotor-Position Estimation by Signal Injection in Brushless AC Motors, Accounting for Cross-Coupling Magnetic Saturation." IEEE Transactions on Industry Applications, vol. 45, No. 5, Sep./Oct. 2009, pp. 1843-1850.

Raca, D. et al. "Carrier-Signal Selection for Sensorless Control of PM Synchronous Machines at Zero and Very Low Speeds." IEEE Transactions on Industry Applications, vol. 46, No. 1, Jan./Feb. 2010, pp. 167-178.

Reigosa, D. D. et al. "Measurement and Adaptive Decoupling of Cross-Saturation Effects and Secondary Saliences in Sensorless Controlled IPM Synchronous Machines." IEEE Transactions on Industry Applications, vol. 44, No. 6, Nov./Dec. 2008. pp. 1758-1767.

Search Report for PCT Patent Application No. PCT/US2020/066527, date of mailing of the international search report dated Apr. 31, 2021, 1 page.

JP2009178019A, English Machine Translation, 24 pages.

\* cited by examiner

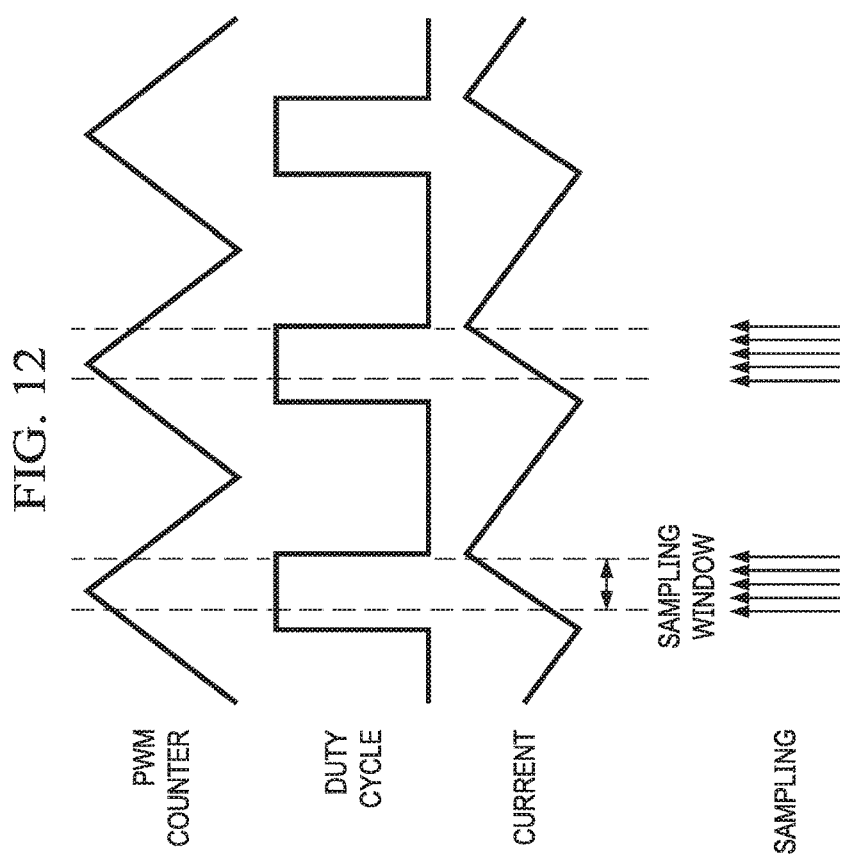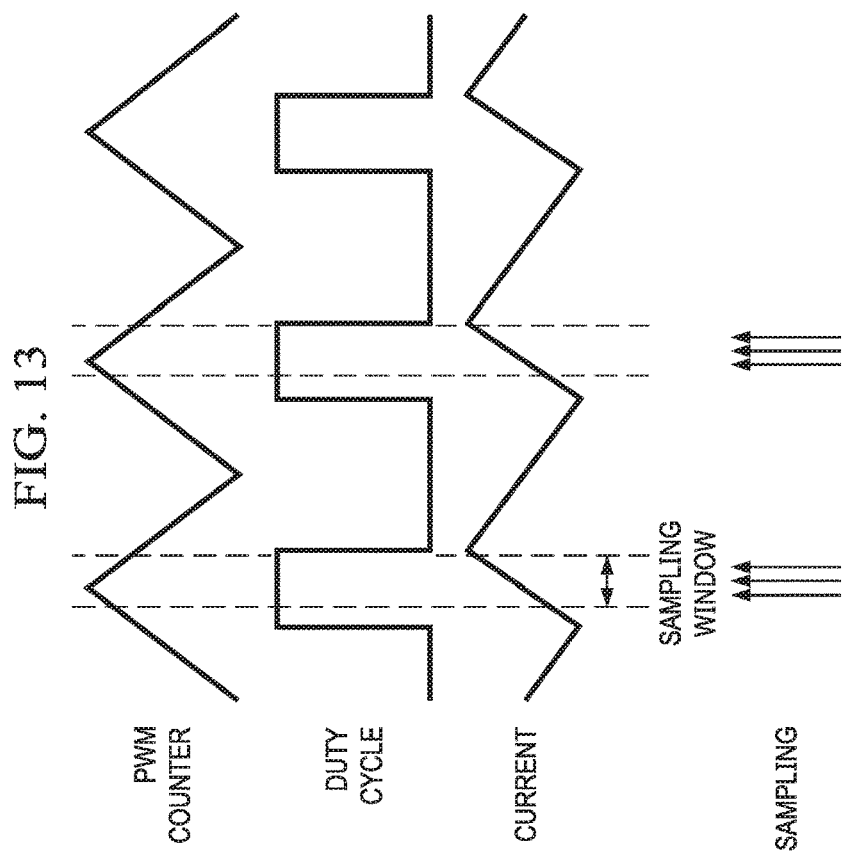

US 11,705,834 B2

SENSORLESS ANGLE ESTIMATION FOR TRAPEZOIDAL CONTROL

TECHNICAL FIELD

This relates generally to systems and methods for controlling brushless DC motors (e.g., three-phase brushless DC motors), and more particularly for sensorless angle estimation for trapezoidal control.

BACKGROUND

Trapezoidal control with Hall effect sensors is a widely employed commutation technique for three-phase brushless direct-current (BLDC) motors, because such motors exhibit a trapezoidal back-electromotive-force (back-EMF) waveform. Such a control approach is used in several applications, such as fans, power tools, and compressors.

A BLDC motor includes two parts rotatable with respect to each other, a rotor and a stator. BLDC motor control can involve determination or estimation of the rotational position of the rotor with respect to the stator. The stator generates a magnetic field to rotate the rotor, which magnetic field has to be, on average, 90 degrees with respect to the rotor. Various methods for BLDC motor control have mechanisms to determine this relative position.

SUMMARY

In one example, a method is useful for sensorless trapezoidal control of a brushless direct-current (BLDC) motor. Voltage signals and a total current signal are measured from the BLDC motor having a rotor. The voltage signals and the total current signal are processed using processing circuitry to estimate an angular position of the rotor or a commutation state of the BLDC motor. This processing uses a nonlinear motor model that provides voltage offsets and at least one of voltage thresholds as a function of current level and current slope or zero-crossing time intervals as a function of current level and current slope. Based on the estimated angular position or commutation state, the motor is controlled during a startup of the BLDC motor.

Another example provides a system that can be used, for example, for sensorless trapezoidal control. The system includes measurement circuitry configured to measure voltage signals and a total current signal from a brushless direct-current (BLDC) motor having a rotor. The system also includes processing circuitry, coupled to the measurement circuitry, configured to process the voltage signals and the total current signal to estimate an angular position of the rotor or a commutation state of the BLDC motor using a nonlinear motor model that provides voltage offsets and at least one of voltage thresholds as a function of current level and current slope or zero-crossing time intervals as a function of current level and current slope. The system further includes control circuitry coupled to the processing circuitry and configured to control the motor during the startup based on the estimated angular position or commutation state.

BRIEF DESCRIPTION OF THE DRAWINGS

FIG. 12 is a timing graph showing example sequential voltage sampling.

FIG. 13 is a timing graph showing example concurrent voltage sampling.

DETAILED DESCRIPTION

Figure 1:
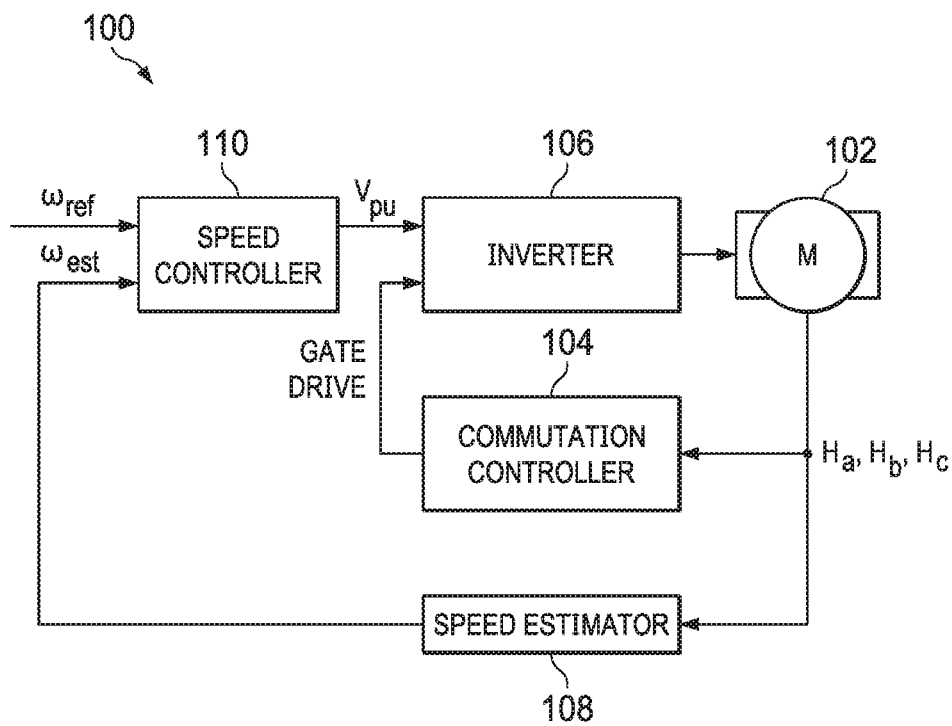
FIG. 1 is a block diagram illustrating an example system for trapezoidal control using Hall effect sensors.

FIG. 1 depicts an example system 100 for trapezoidal control with Hall effect sensors (not shown) in motor 102. The three Hall effect sensor outputs $H_a$, $H_b$ and $H_c$ provide position information used for commutation timing. System 100 uses an inner commutation loop cascaded with one or more outer loops for current, speed, or phase control. In system 100, the inner loop includes motor 102 (and specifically its Hall effect sensors), commutation controller 104, and inverter 106, while the outer loop includes motor 102, speed estimator 108, speed controller 110, and inverter 106. Speed controller 110 provides a duty cycle signal $V_{pu}$ indicative of the desired speed of the motor 102, based on the produced estimate $\omega_{est}$ of the rotor angle from the speed estimator 108 as well as an input reference rotor angle $\omega_{ref}$. The outer loop can be absent in applications such as power tools, electronic bicycles, etc., in which a human operator directly controls the duty cycle signal $V_{pu}$ via a throttle input. The commutation loop creates a rotating stator field vector that leads the rotor, thereby creating a positive torque to counter the resistive load torque. Commutation controller 104 receives its input from Hall effect sensors in motor 102 to provide gate drive inputs to inverter 106.

Figure 2:
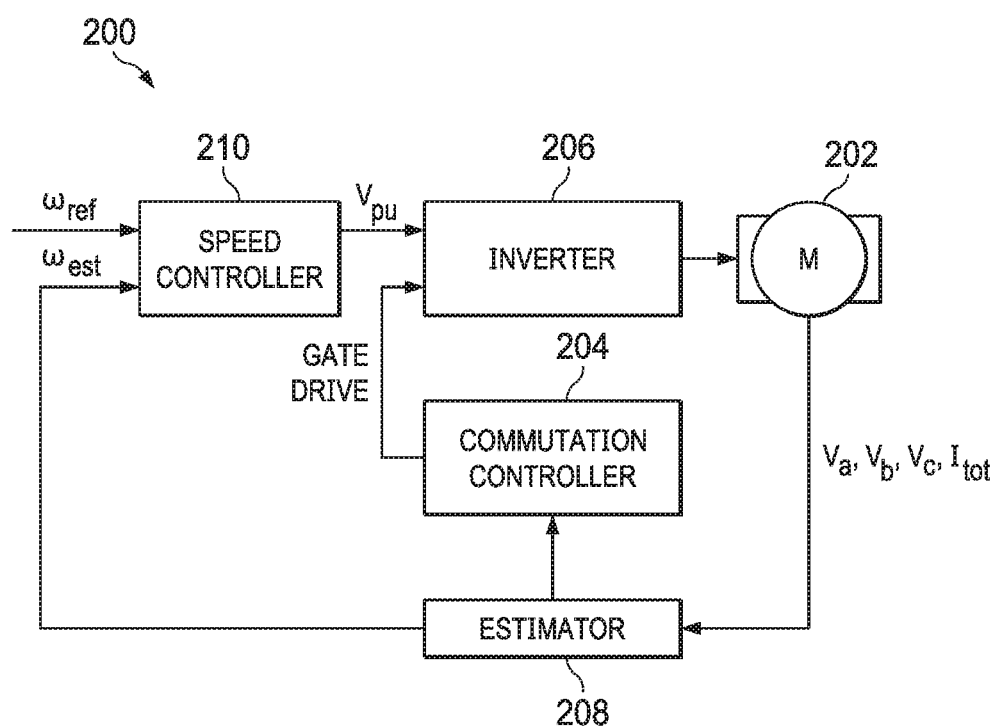
FIG. 2 is a block diagram illustrating an example sensorless system for trapezoidal control.

FIG. 2 depicts an example system 200 for sensorless trapezoidal control. By "sensorless," it is meant that the system functions without the use of Hall effect sensors or encoders to determine the rotor-stator position relationship in a BLDC motor. However, even in "sensorless" implementations, voltages or currents provided by a BLDC can be sensed by circuitry capable of making such measurements. Sensorless implementations can reduce system cost and wiring and can provide improved reliability versus sensored systems. Like system 100, system 200 likewise can include two loops, one including motor 202, speed estimator 208, commutation controller 204, and inverter 106, and another including motor 202, speed estimator 208, speed controller 210, and inverter 206. In the control architecture without Hall effect sensors illustrated in FIG. 2, three phase voltage measurements, notated as $V_a$, $V_b$, $V_c$ in FIG. 2, as can be measured from different nodes in the inverter 206, and total current $I_{tot}$ provided to motor 202, can be provided to estimator 208. The estimator 208 computes the commutation timing using these measurements. In sensorless drive system 200, an estimate $\omega_{est}$ of the rotor angle obtained from sensed electrical signals $V_a$, $V_b$, $V_c$, $I_{tot}$ can be provided to the commutation algorithm implemented in commutation controller 204.

Figure 3:
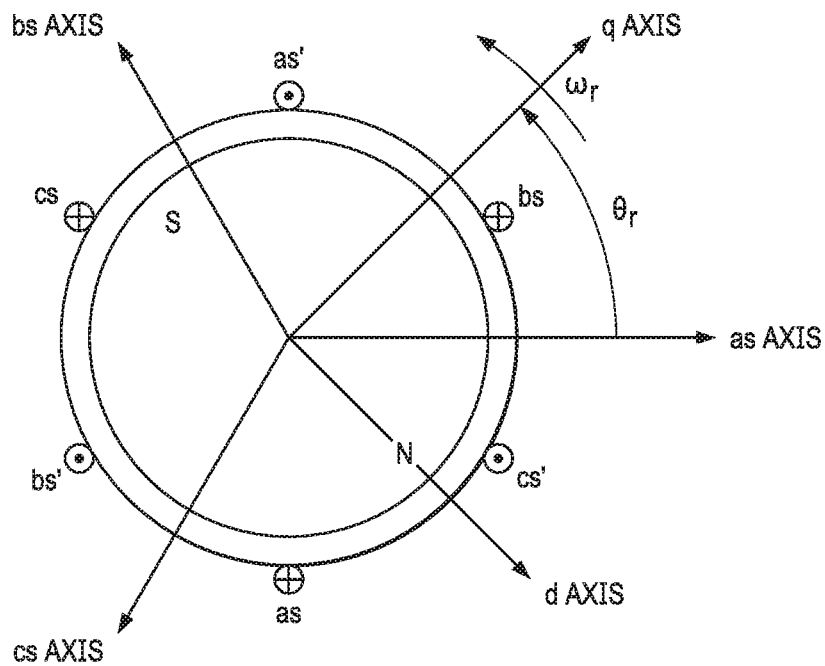
FIG. 3 is a cross-section of an example three-phase brushless DC motor.
Figure 4:
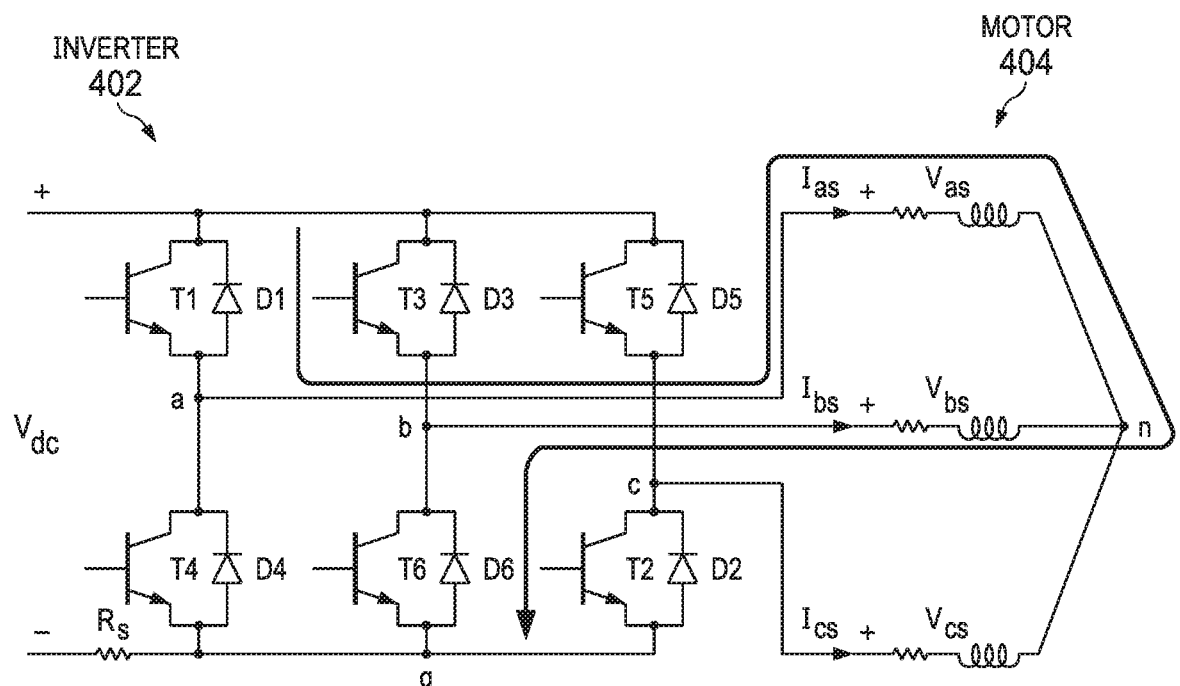
FIG. 4 is a circuit diagram of an example three-phase inverter-motor interconnection.

FIG. 3 illustrates an example cross-section of BLDC motor phase winding axes. The stator field vector moves in discrete steps of 60° (electrical). FIG. 4 illustrates the interconnections between a three-phase inverter 402, which can correspond to inverters 106 or 206 of FIG. 1 or 2, and the three terminals of a BLDC motor 404, which can correspond to motor 102 or 202 of FIG. 1 or 2. In FIG. 4, the voltages at inverter nodes a, b, and c can be sensed and measured with respect to ground to provide voltage signals $V_a$, $V_b$, $V_c$. The current on the bottom side of the inverter can also be measured using sense resistor $R_s$ and an operational amplifier (not shown) to provide total current $I_{tot}$, as shown in FIG. 4.

Figure 5:
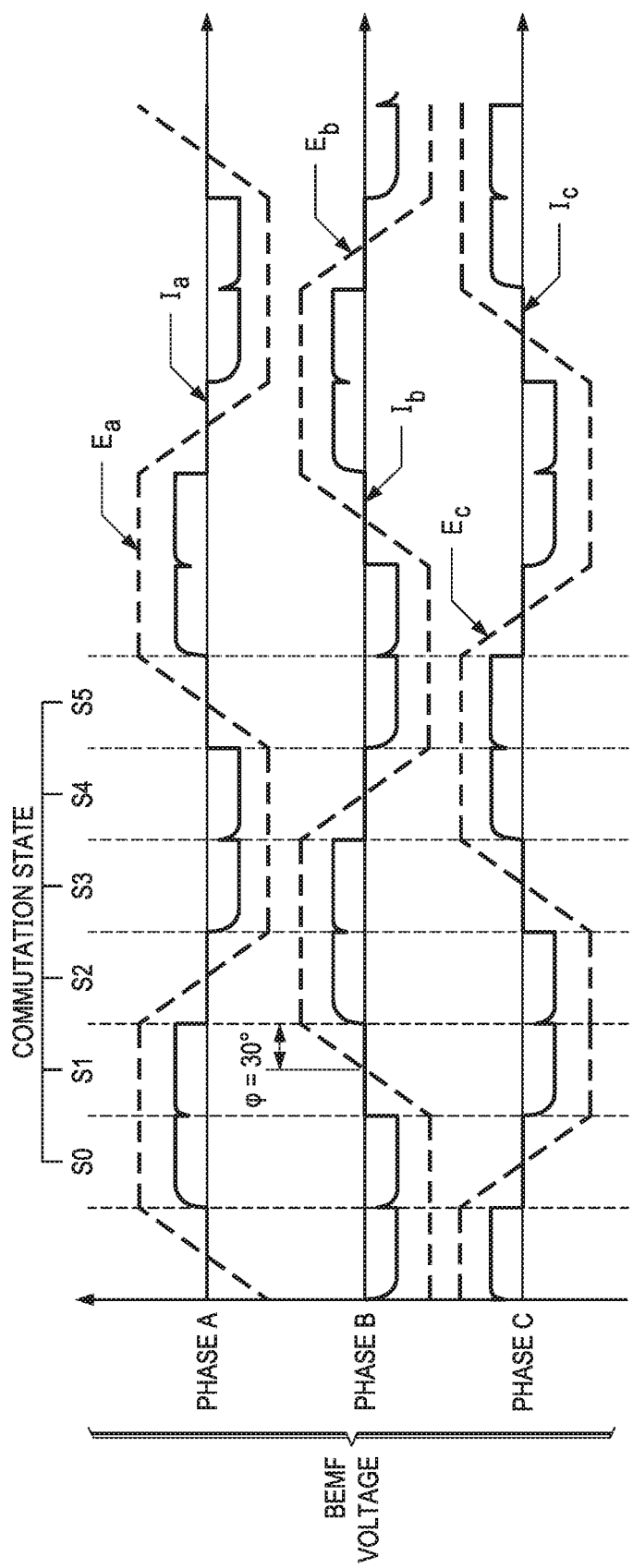
FIG. 5 is a graph of commutation states and the corresponding back-EMF signal for each phase.

The motor operation can be divided into six states, S0 to S5, having switching intervals specified in Table 1. There are six back-EMF zero crossings per electrical rotation, one per state, as shown in FIG. 5. In each state, two half bridges of the three-phase inverter 402 are active, i.e. the gate input of one transistor is held high and the gate input of one transistor is held low in each bridge, and the third half-bridge is floated, i.e., the gate inputs of these transistors are held low.

For example, with reference to FIG. 4, in state S0, the gate input of transistor T6 is held high, the gate input of transistor T3 is held low, and the gate inputs of transistors T1 and T4 are driven by complementary pulse width modulation (PWM) logic. This PWM signaling, which can correspond to $V_{pu}$ of FIG. 1 or 2, can be either directly controlled by an operator or computed by the speed/phase loops, i.e., the outer loops of FIG. 1 or 2. The gate inputs of transistors T2 and T5 in FIG. 4 are held low to drive the current in that phase to zero. This gate configuration corresponds to a certain magnetic field direction. When the rotor has spun enough, the motor needs to "commutate," i.e., to switch phases, so that a new magnetic field vector is generated to impel the rotor to continue to spin. Absent such commutation, i.e., absent continuous reconfiguration of the magnetic field, the rotor would align to the static magnetic field and stop, which is not the desired behavior of a motor commanded to supply a rotating torque to a load. The commutation states, which are a function of rotor angle, are summarized in Table 1. In a system with Hall effect sensors, like the system shown in FIG. 1, the Hall effect sensor outputs contain the rotor position information used to determine the switching instants to transition from one state to another.

TABLE 1

Commutation state table illustrating the electrical angle range for each state and the active transistors

| State | Switching Interval | Active Transistors |
|---|---|---|
| S0 | $-\frac{\pi}{6} - \varphi < \theta_e < \frac{\pi}{6} - \varphi$ | T1, T6 |
| S1 | $\frac{\pi}{6} - \varphi < \theta_e < \frac{\pi}{2} - \varphi$ | T1, T2 |
| S2 | $\frac{\pi}{2} - \varphi < \theta_e < \frac{5\pi}{6} - \varphi$ | T2, T3 |
| S3 | $\frac{5\pi}{6} - \varphi < \theta_e < \frac{7\pi}{6} - \varphi$ | T3, T4 |
| S4 | $\frac{7\pi}{6} - \varphi < \theta_e < \frac{9\pi}{6} - \varphi$ | T4, T5 |
| S5 | $\frac{9\pi}{6} - \varphi < \theta_e < \frac{11\pi}{6} - \varphi$ | T5, T6 |

In a sensorless systems for trapezoidal control like that of FIG. 2, the measured phase voltages are used to estimate the angular position, which is used to determine the commutation state. FIG. 5 illustrates the ideal back-EMF signals $E_a$, $E_b$, $E_c$ corresponding to the six states of an electrical cycle (as broken lines in the graph), and highlights the back-EMF zero crossing during state S1. In the illustrated example, the S1 to S2 commutation occurs at commutation angle $\varphi=\pi/6$ radians past the zero crossing of phase B. Similarly, the S2 to S3 commutation occurs at commutation angle $\varphi=\pi/6$ radians past the zero crossing of phase A.

The rotor electrical angle $\theta_r$ governs the commutation instants and can be computed or estimated from the sensed phase voltage signals $V_a$, $V_b$ and $V_c$ by, for example, computing the corresponding back-EMF signals $E_a$, $E_b$ and $E_c$. The mathematical equations governing the computation of back-EMF are shown in Equations 1 through 3, below. An approach for sensorless trapezoidal control like that taken by system 200 of FIG. 2 assumes a non-salient and sinusoidal motor.

$$V_a = R \cdot I_a + L\frac{dI_a}{dt} + E_a + V_n \qquad (1)$$

$$V_b = R \cdot I_b + L\frac{dI_b}{dt} + E_b + V_n \qquad (2)$$

$$V_c = R \cdot I_c + L\frac{dI_c}{dt} + E_c + V_n \qquad (3)$$

The phase voltages $V_a$, $V_b$, and $V_c$, currents $I_a$, $I_b$, and $I_c$, and back-EMF signals $E_a$, $E_b$, and $E_c$ are related according to Equations 1, 2, and 3. During state S0, the gates of T2 and T5 are held low to drive the current $I_c$ to zero. Substituting $I_c=0$ in Equation 3 and assuming that the derivative of $I_c$ is zero, the measured voltage $V_c$ can be related to the desired back-EMF voltage $E_c$ and neutral voltage $V_n$ according to Equation 4.

$$V_a+V_b+V_c=3V_n \qquad (4)$$

Thus, the back-EMF signal $E_c$ can be computed based on $V_c$ and $V_n$. The neutral voltage can be obtained by making a neutral tap available and sensing the voltage. Alternatively, the neutral voltage can be estimated as follows, thereby eliminating the need for neutral access. Adding Equations 1, 2, and 3, and assuming a sinusoidal motor ($E_a+E_b+E_c=0$), $$V_a+V_b+V_c=3V_n \quad (5)$$

Equations 4 and 5 can be used to estimate the neutral voltage $V_n$ and hence back-EMF signal $E_c$ during state S0 according to Equation 6.

$$E_c=V_c-V_n=V_c-(V_a+V_b+V_c)/3 \quad (6)$$

The zero crossings of the back-EMF signals can first be estimated. Successive zero crossings can be used to estimate speed. Further, the commutation instant can be estimated based on an offset with respect to the zero-crossing that corresponds to the desired commutation angle φ.

The above-described approach to sensorless trapezoidal control of BLDC motors has several limitations, however. Because the magnitude of the back-EMF signal $E_a$, $E_b$, or $E_c$ is directly proportional to the rotor speed, at sufficiently high rotor speeds, the back-EMF signal is a viable signal for rotor position estimation. However, at low speeds, especially during motor startup and transition to sufficient speeds, the back-EMF signal is small or zero and does not provide rotor position information for reliable commutation. Thus, the above-described approach, i.e., the approach of FIG. 2, for example, is valid only when the back-EMF term is dominant at higher motor speeds, and can break down at low speeds, e.g., on motor startup. Furthermore, for trapezoidal-wound and salient motors, the voltage equations contain additional terms.

In contrast to the above-described approach for sensorless control, systems and methods for sensorless trapezoidal control of BLDC motors as described herein can provide low-speed estimation by exploiting the position dependence of motor inductance. This behavior is due to the fact that the PWM current transient results in a mutual inductance component of the total voltage even at zero speeds. Equations 7 and 8 represent the voltage equations for the floating (Phase C) and driven terminals (Phases A and B) of the motor during state S0 and are valid even for trapezoidal back-EMF salient motors, unlike Equations 1 through 3.

$$V_{cn} = I_c R_s + \left(L_0 - L_2\cos2\left(\theta_r - \frac{\pi}{3}\right)\right)\frac{dI_c}{dt} + \sqrt{3} L_2 \quad (7)$$

$$\left\{I_a * 2 * \cos\left(2\theta_r + \frac{\pi}{3}\right) * \omega_r + \sin\left(2\theta_r + \frac{\pi}{3}\right) * \frac{dI_a}{dt}\right\} + \omega_r * \lambda_m F\left(\theta_r + \frac{2\pi}{3}\right)$$

$$V_{ab} = I_a * 2R_s + \left(3L_0 - 3L_2\cos2\left(\theta_r - \frac{\pi}{3}\right)\right)\frac{dI_a}{dt} + \quad (8)$$

$$3L_2\left\{I_a * \sin\left(2\theta_r + \frac{\pi}{3}\right) * 2\omega_r\right\} + \omega_r * \lambda_m\left\{F(\theta_r) - F\left(\theta_r - \frac{2\pi}{3}\right)\right\}$$

The symbols used in the above equations are summarized in Table 2.

TABLE 2

Symbols and Notations

| Variable/Symbol | Description | Units |
|---|---|---|
| $R_s$ | Stator phase resistance | ohm |
| $L_d$, $L_q$ | d-axis and q-axis inductance, respectively | henry |
| $L_0$ | $(L_d + L_q)/3$ | henry |
| $L_2$ | $(L_q - L_d)/3$ | henry |
| $\lambda_m$ | Back-EMF constant | Wb |
| $\omega_r$ | Rotor electrical frequency | rad/s |
| $\theta_r$ | Rotor electrical angle | rad |
| $V_{ab}$ | Voltages applied across A-B | volt |

TABLE 2-continued

Symbols and Notations

| Variable/Symbol | Description | Units |
|---|---|---|
| $V_{cn}$ | Voltage between phase C and neutral | volt |
| $V_a$, $V_b$, $V_c$ | Phase voltage with respect to ground | volt |
| $I_a$, $I_b$, $I_c$ | Phase current | ampere |
| φ | Commutation angle | rad |
| $F(\theta_r)$ | Trapezoidal function | unitless |

The floating terminal voltage contains rotor position information as the summation of two key terms: (a) the mutual inductance term (the third term of Equation 7, i.e., the term beginning with $\sqrt{3}$) and (b) the back-EMF term (the fourth term of Equation 7, i.e., the term beginning with $\omega_r$). When the half bridge driving Phase C is in a high impedance state, $I_c \approx 0$, and the first two terms of Equation 7 are negligible. Permanent magnet motors exhibit saliency ($L_2 \neq 0$) because of a difference between the d and q axes inductances. The position-dependent mutual inductance term $\sqrt{3}L_2 \sin(2\theta_r+\pi/3)*(dI_a/dt)$ is present even at zero and low speeds when the back-EMF term $\omega_r*\lambda_m F(\theta_r+2\pi/3)$ is negligible. The mutual inductance term is a high-frequency term present due to the high frequency PWM switching current with harmonic content near the PWM carrier frequency. The back-EMF term is a low-frequency term with harmonic content near the motor electrical frequency. This separation of the back-EMF and mutual inductance voltage terms in the frequency spectrum can be exploited by having high-frequency and low-frequency signal paths. The extraction of the low- and high-frequency components can be realized via analog or digital filtering, i.e., before or after sampling of the three phase voltage signals by an ADC.

The time rate of change in the Phase A current $dI_a/dt$ in the mutual inductance term in Equation 7, which can also be termed the "current slope" of the Phase A current, can be determined implicitly from Equation 8, because $V_{ab}$ is equal to the DC bus voltage ($V_{dc}$ in FIG. 4). Thus, the left-hand side of Equation 8, $V_{ab}$, is known to the estimator because it is what is being driven. For example, multiple samples of total current $I_{tot}$ can be sampled in a PWM cycle to aid the estimate of current slope.

By increasing $dI_a/dt$, the level of the signal being sensed can be increased and the SNR can thereby be improved. If the motor is such that the $L_2$ in Equation 7 is very small, $V_{cn}$, which is a function of inductance $L_2$, will also be very small, meaning that SNR is dependent on the motor and may also be very small. Accordingly, the DC bus voltage feeding the PCM input can be dynamically increased at motor startup or when falling to motor speeds beneath a threshold motor speed (and subsequently maintained for the duration of such low motor speeds) to increase the SNR of the measured and estimated voltage signals. For example, $V_{cn}$ can be estimated based on the measured signals $V_a$, $V_b$, $V_b$, and $I_{tot}$. Angle $\theta_r$ is the main unknown to be determined, because it is what is needed for spinning the motor. Inductance $L_2$ is a function of current that varies with current. Therefore, the effect of variation of inductance on current level can be captured. For example, a lookup table can store the different commutation voltages as a function of current. To obtain this lookup table, for example, the motor can be spun with a sensor, recording all the voltages and currents at different commutation instances, storing these values in a lookup table. The inductance $L_2$ for different levels of current $I_{tot}$ then being known, and $I_a$ and $dI_a/dt$ having been determined, $\sin(2\theta_r+\pi/3)$ can be estimated at low speeds (e.g., by digital logic in estimator 608 in FIG. 6 or other digital logic) as $V_{cn}/(\sqrt{3}*L_2 dI_a/dt)$, resulting in an estimate of rotor electrical angle $\theta_r$. Such a lookup table can be user-programmable within the estimator 608 (i.e., within the digital logic 708 or 808 of FIG. 7 or 8), or the estimator or digital logic can be programmed (e.g., preprogrammed) with lookup tables for a variety of different BLDC motors and the appropriate lookup table can be user-selected at the time of motor-controller integration.

Alternatively, rather than estimating rotor electrical angle $\theta_r$, digital logic in an estimator can be configured to estimate the voltage at which a commutation event happens, a commutation event being a transition between one of the states S0, S1, etc., as shown in FIG. 5 and the top graphs of FIGS. 9-12 (voltage and $\theta_r$ being related). In such an alternative, a motor can be driven to known rotor electrical angle $\theta_r$, and all of the commutation voltages can be recorded and saved to a lookup table later used by the estimator. Again, such a lookup table can be programmed by an end user (i.e., the motor-controller integrator) or can be end-user-selectable from among a variety of available lookup tables at the time of motor-controller integration.

Figure 6:
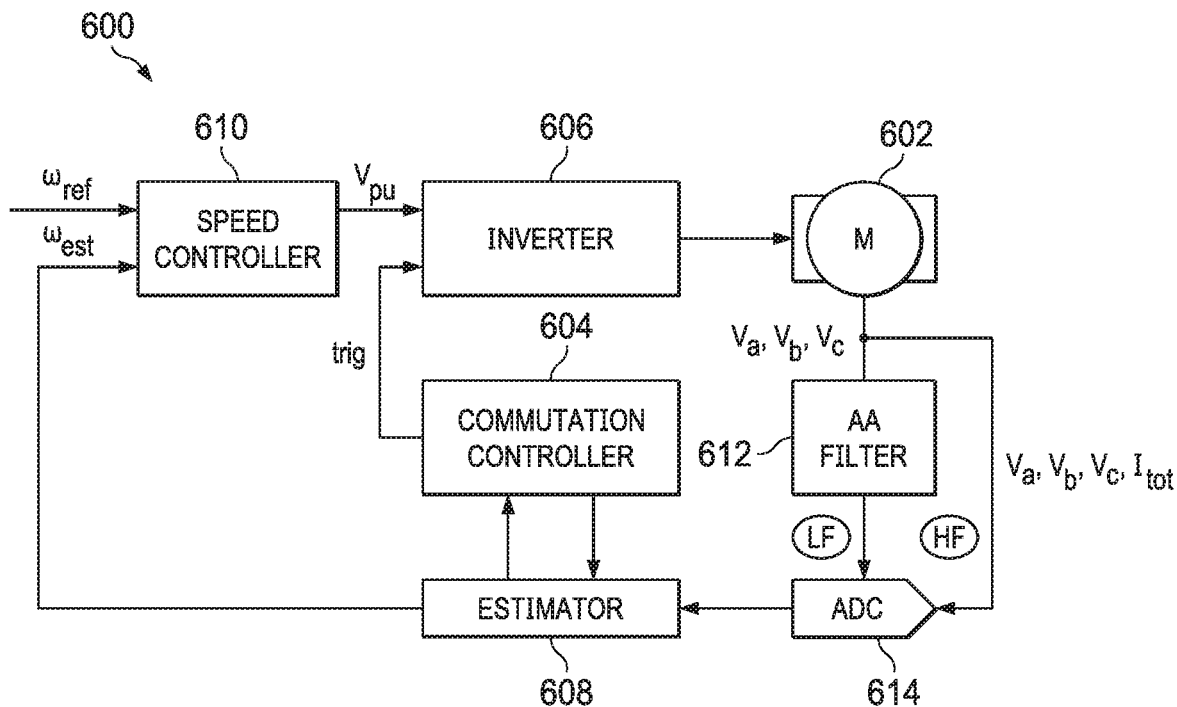
FIG. 6 is a block diagram illustrating an example sensorless system for trapezoidal control.

FIG. 6 illustrates an example analog-filter-based system 600 for trapezoidal control of BLDC motors that makes use of the above-described exploitation of frequency separation of the back-EMF and mutual inductance voltage terms. It can use, for example, an anti-aliasing (AA) filter 612 to provide the low-frequency component. The sensed phase voltages are sampled in two separate paths (i.e., a low-frequency (LF) path and a high-frequency (HF) path) corresponding to the filtered and unfiltered paths, respectively. As used herein, the "high" and "low" frequency ranges are a function of the electrical time constant of the motor (L/R) and the PWM frequency. The PWM frequency can be, for example, between eight times and ten times the time constant. The low pass filter can be, for example, between about five times and about eight times the time constant. These LF and HF data paths can be realized in any of several physical forms. The LF path contains position information arising from the back-EMF component and the HF path contains position information arising from the total of the back-EMF and mutual inductance components. The LF and HF data can also be obtained using a single data path (e.g., the LF path in the dual data path arrangement described above) using a low-pass filter with a higher cut-off frequency, so that the unfiltered path contains all of the LF and HF data needed. Then the LF data can be obtained by digitally low-pass filtering the data from the unfiltered path. By having both LF and HF paths, the LF data path contains only the back-EMF term (the fourth term of Equation 7) whereas the HF data path contains only the mutual inductance term (i.e., the third term of Equation 7), permitting these two signals to be used to determine the values needed to estimate the position of the motor 602.

Like systems 100 and 200, system 600 likewise can include two loops, one including motor 602, antialiasing (AA) filter or other low-pass filter 612, analog-to-digital converter (ADC) 614, speed estimator 608, commutation controller 604, and inverter 606, and another loop including motor 602, AA filter or other low-pass filter 612, ADC 614, speed estimator 608, speed controller 610, and invertor 606. A digital-value estimate $\omega_{est}$ of the rotor angular velocity obtained based on sensed electrical signals $V_a$, $V_b$, $V_c$, $I_{tot}$ can be provided to digital circuitry implementing a commutation algorithm in digital-logic commutation controller 604. ADC 614 can, for example, be one ADC with multiple channels sampling the LF and HF data paths. ADCs can sample at much higher speeds than motors require, so one ADC can sample the different paths in sequence. Alternatively, the LF/HF filtering can be done digitally, by having the measured signals sampled at sufficiently high frequencies to capture all of the desired high-frequency content (e.g., with a sampling rate of greater than a kilosample per second). Although in the illustrated example only three voltage signals $V_a$, $V_b$, $V_c$ are sensed and provided to antialiasing filter 612 or ADC 614, in other examples a greater number of voltage signals are sensed and provided.

The benefit provided by the improved systems/methods for sensorless trapezoidal control, as described herein, can be understood in the context of a drill, a pump, or any motor application in which the motor experiences a significant load at startup, when the speed is close to zero, and the relative rotor-stator position is unknown. The fourth term of Equation 7 (i.e., the term beginning with cur) will only exist after the motor starts spinning. The present systems and methods can accordingly estimate the relative rotor-stator position during startup using the third term (i.e., the term beginning with $\sqrt{3}$) of Equation 7.

Figure 7:
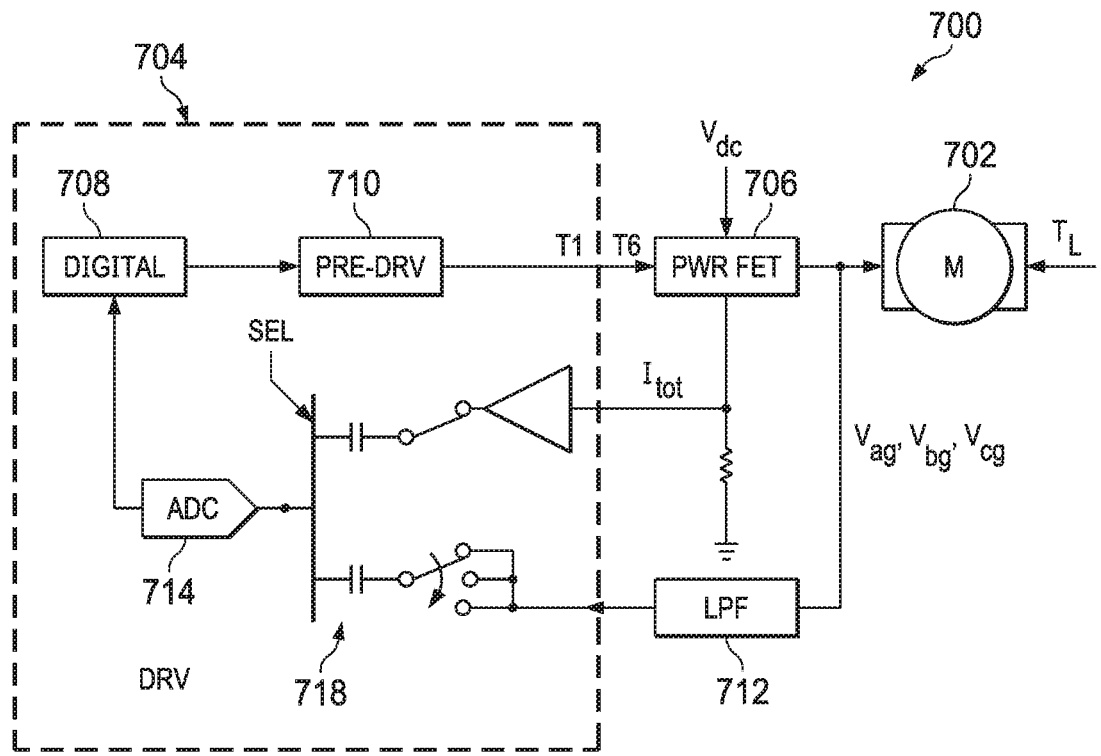
FIG. 7 is a block diagram illustrating an example sensorless system for trapezoidal control.
Figure 8:
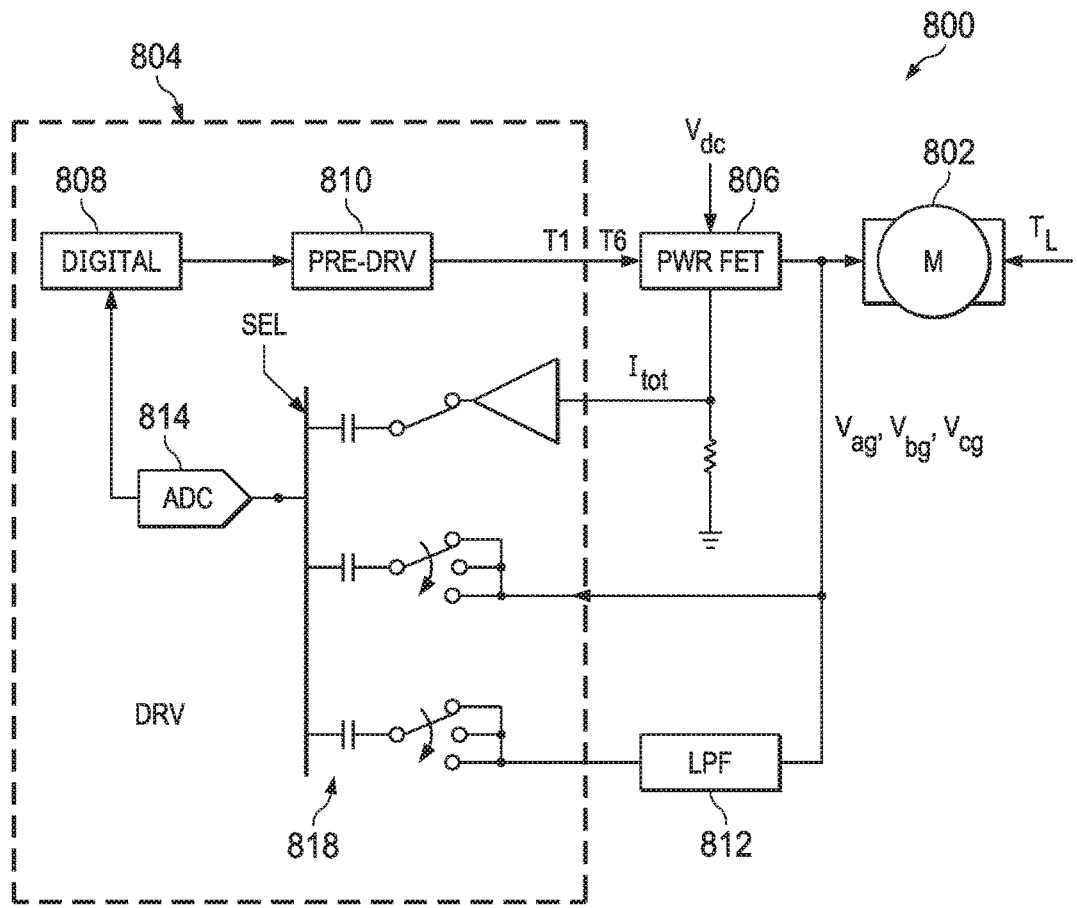
FIG. 8 is a block diagram illustrating an example sensorless system for trapezoidal control.

FIGS. 7 and 8 illustrate two example sensorless trapezoidal control architectures, with FIG. 8 illustrating an analog front-end realization of the described approach for sensorless trapezoidal control. In the sensorless architecture of FIG. 7, driver circuitry 704 includes multiplexer switch 718 with sampling capacitors, ADC 714, digital logic 708, and pre-driver circuitry 710, the latter of which can prepare digital outputs of digital logic 708 for delivery to power FET 706 for amplification as delivered pulse-width modulated driving signals to motor 702. Power FET 706 accordingly can correspond to inverter 206 of FIG. 2 or 402 of FIG. 4. Pre-driver circuitry 710 can, for example, be implemented as a Texas Instruments Incorporated three-phase smart gate driver with three current shunt amplifiers, DRV8323. As seen at the right of FIG. 7, the phase voltages with respect to ground $V_a$, $V_b$, $V_c$ are filtered by low-pass filter 712 to remove high-frequency switching components, and the back-EMF signal is reconstructed in an estimator included in digital logic 708. Multiplexing switch 718 selects between the paths for analog-to-digital conversion by ADC 714 and subsequent estimation in digital logic 708. Although the illustrated example senses three voltage signals $V_a$, $V_b$, $V_c$, other examples can sense and sample a greater number of voltage signals. Because low-pass filter 712 filters out the mutual inductance component in the voltage signal, the architecture of FIG. 7 is not especially viable for angle estimation during startup under load of BLDC motor 702. In an alternate example, not specifically illustrated, the low-pass filter 712 can be disincluded such that only the total spectrum of each of the phase voltage signals is sampled. The total-spectrum signals are then used to determine commutation timing instants. The drawback of this approach is the summation of back-EMF and mutual inductance components in the total signal makes it challenging to determine an appropriate voltage threshold for commutation timing during startup.

In the sensorless architecture of FIG. 8, driver circuitry 804 includes multiplexer switch 818 with sampling capacitors, ADC 814, digital logic 808, and pre-driver circuitry 810, the latter of which can prepare digital outputs of digital logic 808 for delivery to power FET 806 for amplification as a delivered pulse-width modulated driving signals to motor 802. Pre-driver circuitry 810 can, for example, be implemented as a Texas Instruments Incorporated three-phase smart gate driver with three current shunt amplifiers, DRV8323. As seen at the right of FIG. 8, the phase voltages with respect to ground $V_a$, $V_b$, $V_c$ are filtered by low-pass filter 812 to remove high-frequency switching components. In contrast to the architecture shown in FIG. 7, however, the analog front-end of FIG. 8 provides both filtered and unfiltered versions of these three phase voltage measurements to multiplexer switch 818 and ADC 814 for selection and sampling. Accordingly, multiplexer switch 818 can select between low-pass filtered and unfiltered versions of all three of phase voltages $V_a$, $V_b$, and $V_c$. The back-EMF signal can then be reconstructed in an estimator included in digital logic 808. Although the illustrated example senses three voltage signals $V_a$, $V_b$, $V_c$, other examples can sense and sample a greater number of voltage signals.

Because the systems and methods described herein enable separation of the back-EMF and mutual inductance components, during motor startup, the mutual inductance component (from the third term of Equation 7) can be used to determine commutation timing. After the motor reaches a certain desired speed, the back-EMF component (from the fourth term of Equation 7) can be additionally exploited to determine the commutation timing. The value of such a desired speed can, for example, be set as a user-configurable threshold in digital logic 708 or 808.

The systems and methods described herein can use a nonlinear motor model for sensorless angle estimation for trapezoidal control. For example, such a nonlinear motor model can provide voltage thresholds, offsets, and zero-crossing time intervals as a function of current level and current slopes. The inductances $L_0$ and $L_2$ in Equations 7 and 8 are functions of current and commutation advance angle φ. The saliency inductance $L_2$ decreases with increasing current levels. Setting the drive voltage, such as $V_{ab}$ in the left-hand side of Equation 8, to be equal to $V_{DC}$ or 0 corresponding to PWM on and off, the slope of current in the driven phases (e.g., $dI_a/dt$ in Equation 8) is a function of current level and commutation advance angle φ. This dependence is illustrated in Equation 9, simplifying Equation 8 for low speed and explicitly denoting the dependence of inductance on current and commutation angle.

$$\frac{dI_a}{dt} = \frac{\{V_{DC} - I_a * 2R_s\}}{\left\{3L_0(I_a, \varphi) - 3L_2(I_a, \varphi)\cos 2\left(\theta_r - \frac{\pi}{3}\right)\right\}} \quad (9)$$

This slope impacts the floating phase voltage with respect to neutral as given by Equation 7. The floating phase voltage with respect to neutral can be estimated from the measured phase-to-ground voltages or its filtered derivatives using Equation 6.

Substituting Equation 9 into Equation 7 and simplifying the equation at low-speeds, the floating terminal voltage can be expressed according to Equation 10. In this equation, an additional phase-offset term $Ø(I_a, \varphi)$ is introduced to depict the effect of saturation on phase.

$$V_{cn} = \sqrt{3} L_2(I_a, \varphi) \quad (10)$$

$$\left\{\sin\left(2\theta_r + \frac{\pi}{3} + Ø(I_a, \varphi)\right) * \frac{\{V_{DC} - I_a * 2R_s\}}{\left\{3L_0(I_a, \varphi) - 3L_2(I_a, \varphi)\cos 2\left(\theta_r - \frac{\pi}{3}\right)\right\}}\right\}$$

The phase to neutral voltages not only vary with rotor position but also current level and commutation angle in the nonlinear region of operation. Therefore, one approach to extract rotor position information from the phase measurements is to provide a nonlinear map of the voltage to neutral variation as a function of position for various current levels. This characterization can be accomplished by driving the motor while the motor is equipped with a sensor such as an encoder or Hall sensor and building a model relating the floating voltage to neutral as a function of current level and current slope.

Figure 9:
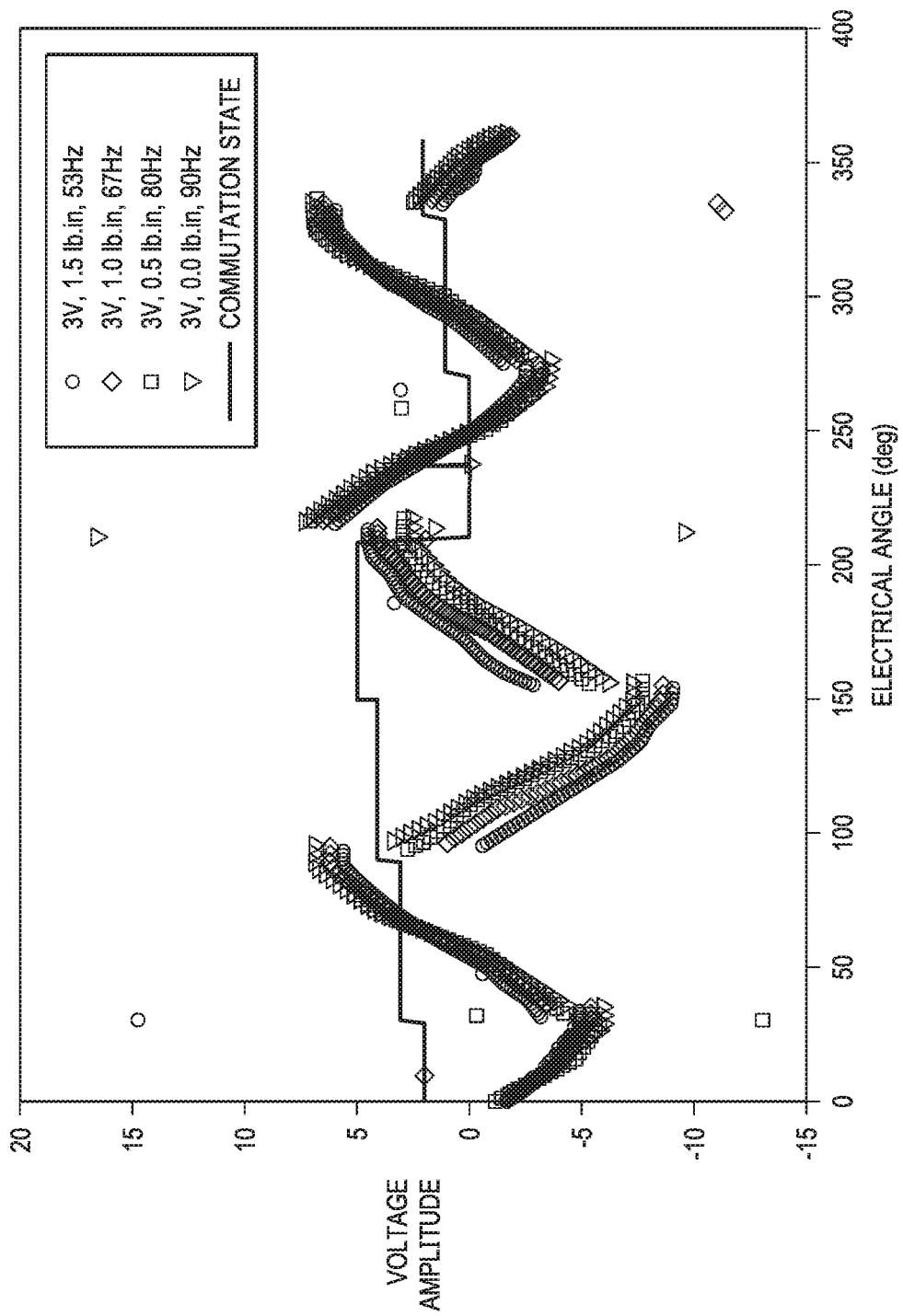
FIG. 9 is a plot illustrating example spectral separation of back-EMF and inductance related voltage terms.

An example of such characterization data is illustrated in FIG. 9, which plots example phase-to-neutral voltage waveforms as a function of load (i.e., current) levels for different speeds. Specifically, the graph of FIG. 9 plots rotor electrical angle $\theta_r$ in degrees as a function of voltage amplitude for different frequencies and loads. Thus, the back-EMF voltage estimates vary with angle and load (i.e., current) levels. By applying Taylor series approximation, it can be shown that Equation 10 can be approximated to a first order by a linear relationship with a slope and offset around the zero-crossings for each commutation interval. Accordingly, from the plot of FIG. 9, estimation equations for each state of the commutation cycle can be created to predict the zero crossing of the back-EMF waveform. Further, a set of estimation equations can be created at discrete current levels that represent the operating range of the motor. The six-level commutation state is also plotted in FIG. 9.

Thus, the above nonlinear voltage versus angle and current data, the underlying model for which is given by Equation 10, can in some examples be modeled by building a table of offsets and one or both of zero-crossing time durations and/or commutation voltages (i.e., voltage thresholds) as a function of rotor angle and current. In other examples, other known curve-fitting techniques can be used for the model fitting. This building of the table of offsets, zero-crossing time durations, and commutation voltages constitutes the training of the nonlinear motor model.

After a nonlinear motor model is constructed (i.e., trained) offline (i.e., prior to regular operation of the motor to be controlled), during regular operation, a sensorless commutation algorithm can use voltage and current measurements as inputs in tandem with the stored nonlinear motor model to arrive at a commutation decision and thereby control the motor.

Figure 10:
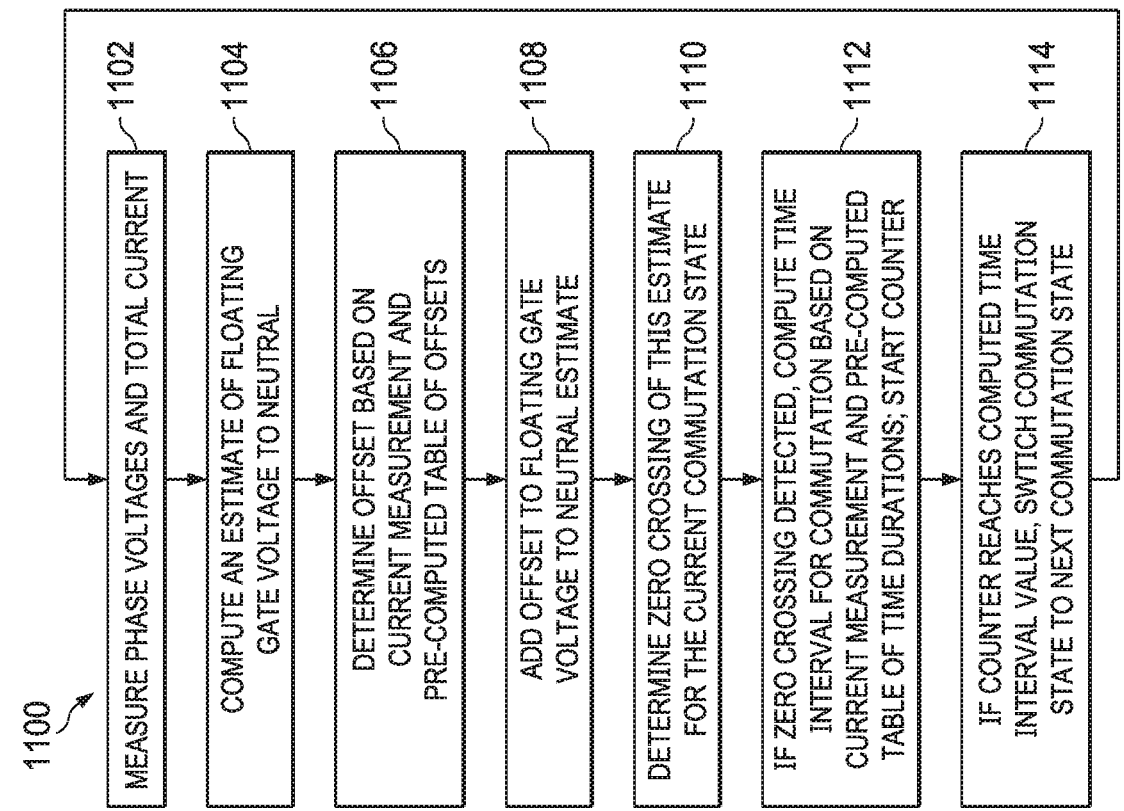
FIG. 10 is a flow diagram of an example algorithm for motor control.
Figure 11:
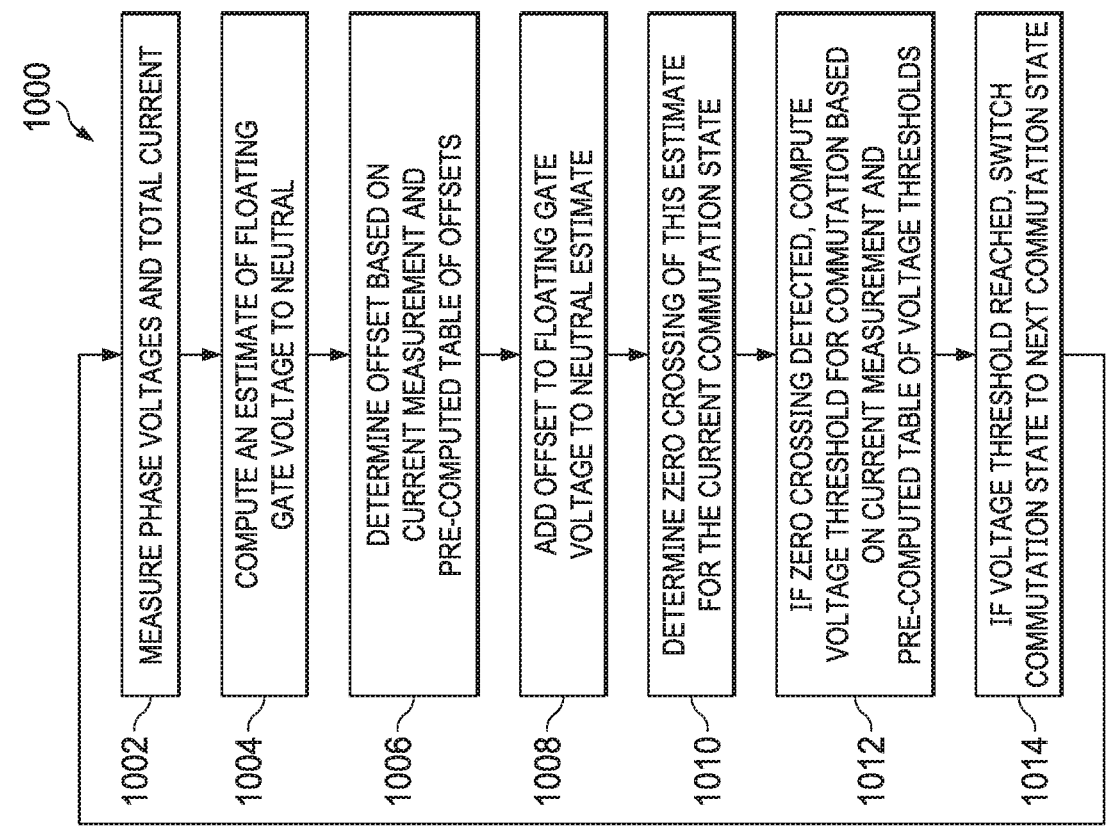
FIG. 11 is a flow diagram of another example algorithm for motor control.

FIGS. 10 and 11 illustrate example commutation algorithms 1000, 1100 that can compute the commutation state based on the constructed nonlinear motor model. In each example algorithm, the voltages used to compute 1004, 1104 the floating gate voltage to neutral can be the filtered or unfiltered phase voltages. The computation of $V_n$ in Equation 6 can be implemented using either analog or digital circuitry.

In the commutation algorithm 1000 of FIG. 10, voltages and total current are measured 1002 from a brushless DC motor, and an estimate of floating gate voltage to neutral is computed 1004. This computation 1004 can be done, for example, using Equation 6, above. An offset is determined 1006 based on the current measurement and a precomputed table of voltage offsets. This precomputed table of offsets can, for example, have been computed in accordance with the methodology described above in conjunction with Equation 10 and FIG. 9. That is, the precomputed table of offsets can be part of the aforementioned nonlinear motor model. Then, the determined offset can be added 1008 to the computed floating gate voltage to neutral estimate. In operation of the brushless DC motor, the zero crossing of this estimate can be determined 1010 for the current commutation state. Based on a zero crossing being detected, the voltage threshold for commutation can be computed 1012 based on the current measurement and a precomputed table of voltage thresholds. This precomputed table of voltage thresholds can likewise be part of the aforementioned nonlinear motor model. Based on a voltage threshold being reached, the commutation state can be switched 1014 to the next commutation state. This switching decision in effect determines which of the drivers in the brushless DC motor— e.g., among the six half-bridge drivers shown in FIG. 4—are on, and which of the drivers are off. The current and voltage measurement 1002 is then repeated and the entire process 1000 cycles, for example at a rate that substantially exceeds any expected maximum physical rotation rate of the motor, to provide the desired improved commutation control.

In the commutation algorithm 1100 of FIG. 11, voltages and total current are measured 1102 from a brushless DC motor, and an estimate of floating gate voltage to neutral is computed 1104. This computation 1104 can be done, for example, using Equation 6, above. An offset is determined 1106 based on the current measurement and a precomputed table of offsets. This precomputed table of offsets can, for example, have been computed in accordance with the methodology described above in conjunction with Equation 10 and FIG. 9. That is, the precomputed table of offsets can be part of the aforementioned nonlinear motor model. Then, the determined offset can be added 1108 to the computed floating gate voltage to neutral estimate. In operation of the brushless DC motor, the zero crossing of this estimate can be determined 1110 for the current commutation state. Based on a zero crossing being detected, a time interval for commutation can be computed 1112 based on the current measurement and a precomputed table of time durations (i.e., zero-crossing time intervals), and a counter is started. This precomputed table of time durations can likewise be part of the aforementioned nonlinear motor model. Based on the counter reaching the computed time interval value (i.e., as computed in 1112), the commutation state can be switched 1114 to the next commutation state. This decision determines which of the drivers in the brushless DC motor— e.g., among the six half-bridge drivers shown in FIG. 4—are on, and which are off. The current and voltage measurement 1102 is then repeated and the entire process 1100 cycles, for example at a rate that substantially exceeds any expected maximum physical rotation rate of the motor, to provide the desired improved commutation control.

The timing graphs of FIGS. 12 and 13 illustrate the operation of two different example architectures for sampling the voltages and currents. FIG. 12 represents an architecture where the voltage and current samples are obtained sequentially within the interval where the current slope is positive. FIG. 13 represents an architecture where the voltage samples are obtained concurrently followed by the sequential acquisition of the current samples. Three phase voltage and two current samples are illustrated in the examples of FIGS. 12 and 13, explaining why FIG. 12 shows five arrows per cycle (one arrow each representing three sequential voltage measurements and two other arrows representing two sequential current measurements) and FIG. 13 shows three arrows per cycle (one arrow representing three concurrent voltage measurements and two other arrows representing two sequential current measurements). In each example, the two current samples can be used to determine the current slope. These sampling examples are particular to three-phase motors, but are adaptable to motors of other numbers of phases.

Figure 14:
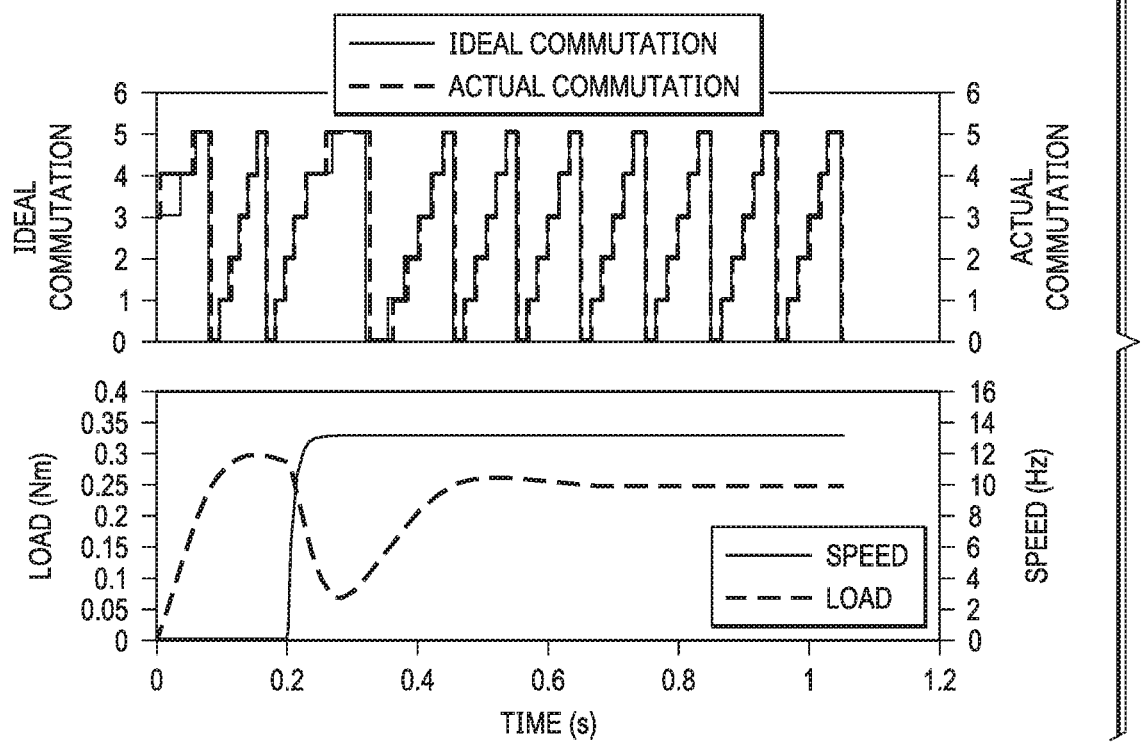
FIG. 14 is a graph showing example performance of one approach to sensorless trapezoidal control when a load is applied at speed.
Figure 15:
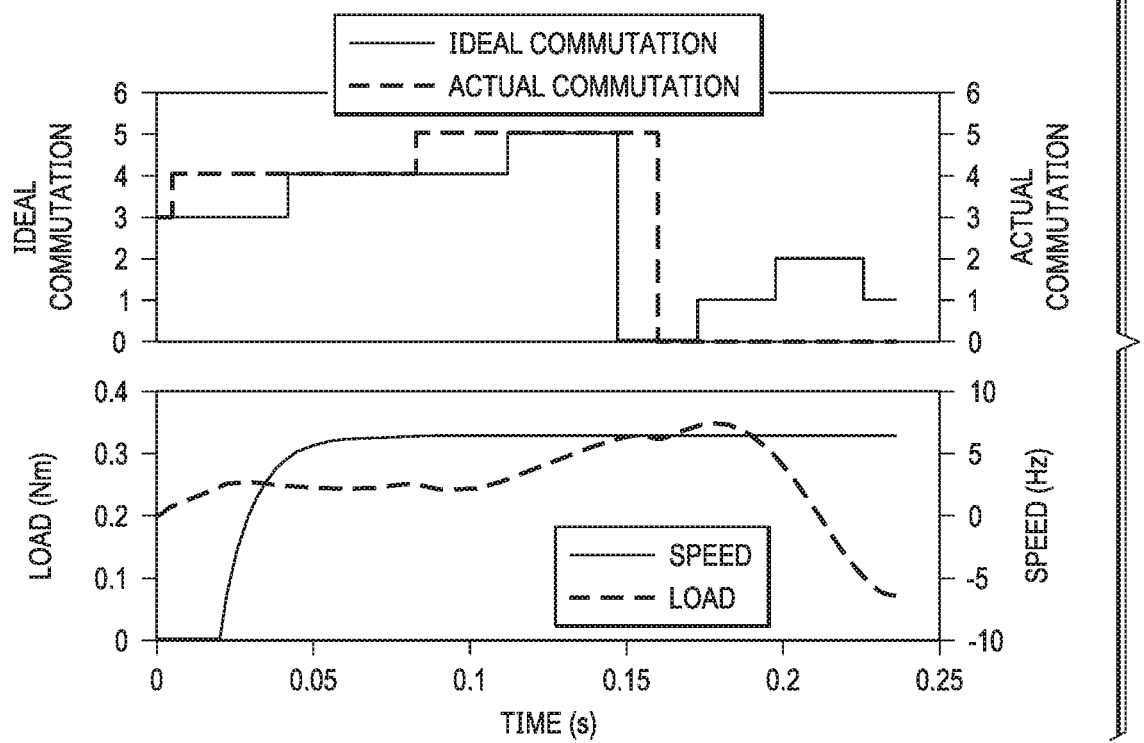
FIG. 15 is a graph showing example performance of the same approach as in FIG. 14 to sensorless trapezoidal control when a load is applied at motor startup.

FIGS. 14 and 15 illustrate performance of a sensorless trapezoidal control system like that of FIG. 2 when a 1.4× rated load is applied at speed (FIG. 14) versus at startup (FIG. 15). In the illustrated approach, the commutation instant (i.e., S0, S1, S2, S3, S4, or S5), shown in the respective top graphs of FIGS. 14 and 15, is determined based on a fixed electrical angular offset (e.g., 30°) with respect to the back-EMF zero crossing. This offset is calculated based on the speed estimate. As shown in FIG. 14, when the motor is at already at speed prior to application of a load (starting at 0.2 seconds), the actual commutation converges well with the ideal commutation. However, during motor startup, when a reliable speed estimate is not available, this approach breaks down, as shown in FIG. 15, where a rated load is applied during startup, and the actual commutation state does not converge with the ideal commutation state (shown in the top graph of FIG. 15).

Figure 16:
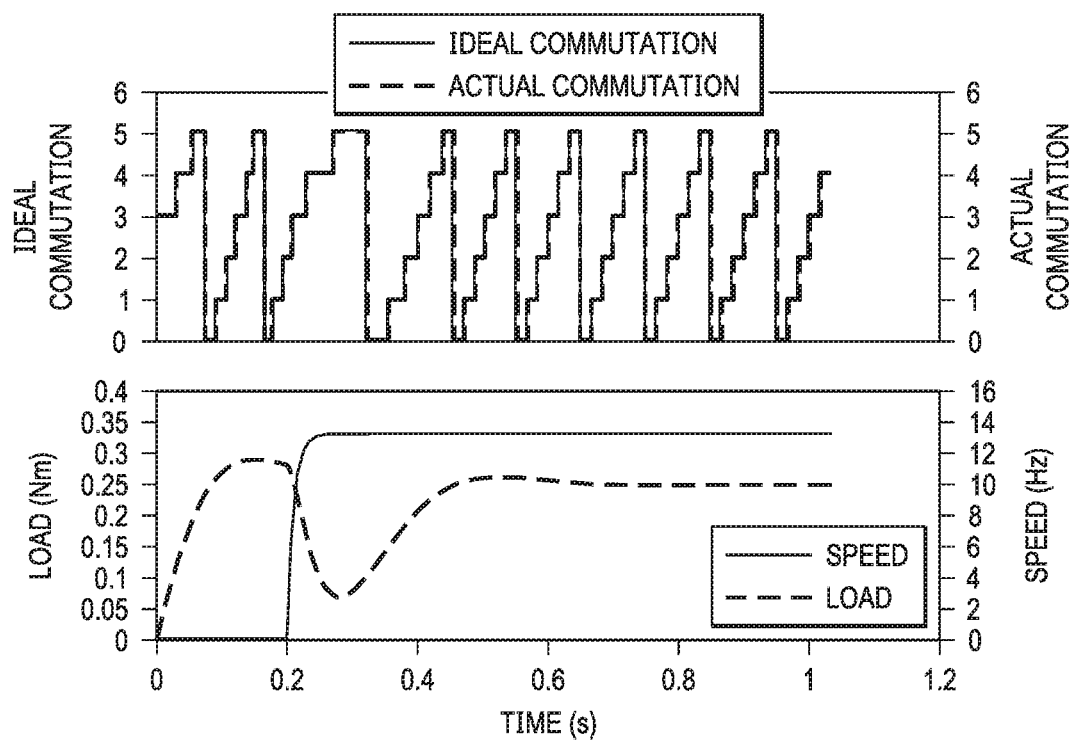
FIG. 16 is a graph showing example performance of an example approach to sensorless trapezoidal control when a load is applied at speed.
Figure 17:
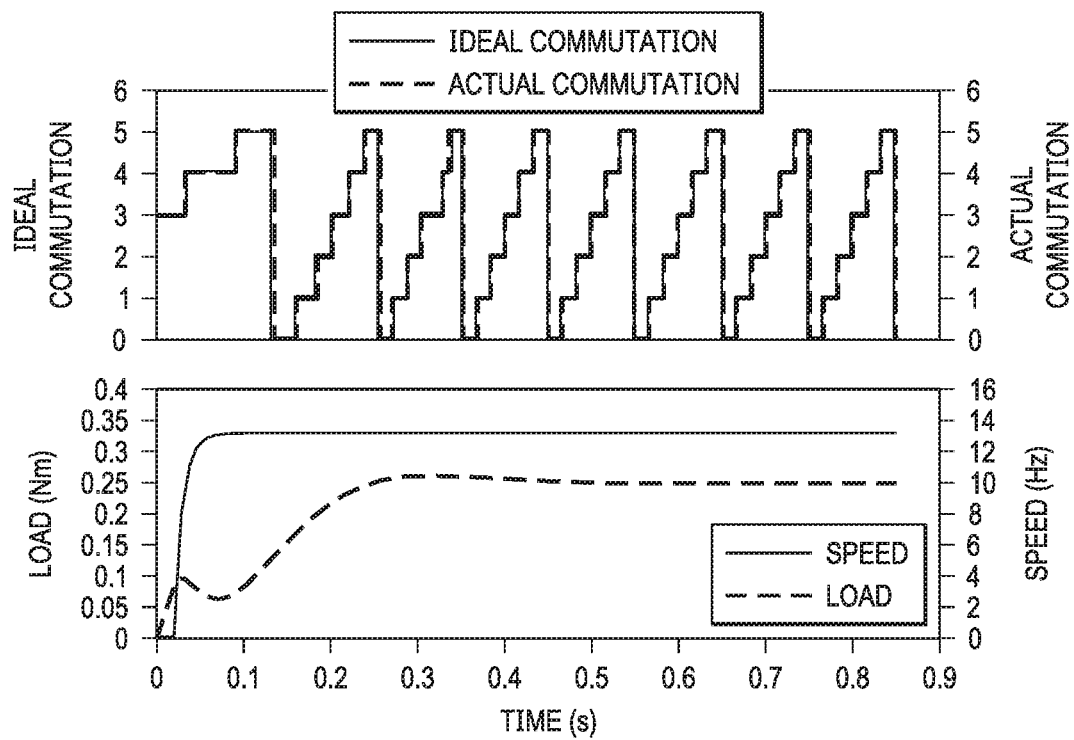
FIG. 17 is a graph showing example performance of the example approach as in FIG. 16 to sensorless trapezoidal control when a load is applied at motor startup.

FIGS. 16 and 17 illustrate performance of a sensorless trapezoidal control system like that of FIGS. 6-8 when a 1.4× rated load is applied at speed (FIG. 16) versus at startup (FIG. 17). In the approach illustrated by FIGS. 16 and 17, the commutation instant can be determined based on applying a threshold voltage to the reconstructed floating phase to neutral voltage. For example, a threshold value can be applied to the mutual inductance voltage alone during motor startup, thereby eliminating the dependence of commutation on the unknown motor speed. After the motor reaches a desired speed, a threshold value can be applied to the back-EMF component, as this component has sufficient signal-to-noise ratio (SNR) at mid-to-higher speeds. The threshold values can be generated from a look-up table that maps the variation in threshold voltage with current-varying inductances in the saturation region. Accordingly, as shown in the respective top graphs of FIGS. 16 and 17, this approach exhibits excellent convergence between actual commutation and ideal commutation both at low and at high speeds, even without Hall effect sensors or encoders.

Figure 18:
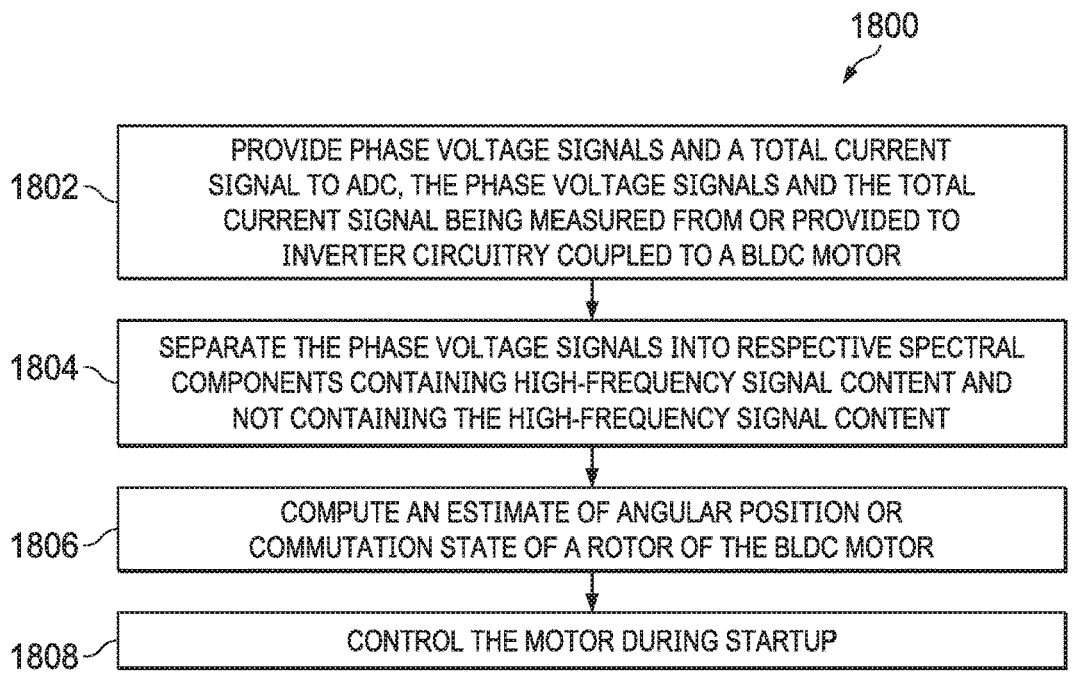
FIG. 18 is a flow chart of an example method of sensorless trapezoidal control.

FIG. 18 illustrates a method 1800 for sensorless trapezoidal control. Voltage signals (e.g., three such phase voltage signals) and at least one total current signal are measured from a BLDC motor and can be provided 1802, for example, to an analog-to-digital converter for digital sampling. For example, the voltage signals and the total current signal can be measured from or provided to inverter circuitry coupled to the BLDC motor (e.g., a three-phase BLDC motor). These measured signals can be processed, or signals derived from these signals can be processed. As an example of signals derived from these measured signals, before or after the digital sampling, the voltage signals can be separated 1804 into first spectral components containing high-frequency signal content and second spectral components excluding the high-frequency signal content. The voltage signals can, for example, be separated into first components containing high-frequency signal content and second components excluding the high-frequency signal content by filtering the three phase voltage signals with an antialiasing filter.

Based on the measured signals and/or signals derived therefrom (e.g., the frequency-component-separated voltage signals and the total current signal), an estimate is computed 1806 of angular position or commutation state of a rotor of the motor during a startup of the BLDC motor. This estimate can be computed, for example, using digital logic circuitry such as estimator 608 in FIG. 6 or digital circuitry 708 or 808 in FIG. 7 or 8. The estimate computation can include determining a commutation voltage value or a current-dependent inductance value from a lookup table stored in the digital logic circuitry.

In this description, the term "startup" is defined as any region of operation where the angular speed of the motor is below a speed threshold and thereby causes the mutual inductance term in the motor model (i.e., the third term of Equation 7 above) to have a majority influence on (i.e., dominate) the estimated position or commutation state. In contrast, if the angular speed of the motor is above the speed threshold, then the mutual inductance term's influence decreases, and the back-EMF term in the motor model (i.e., the fourth term of Equation 7 above) has the majority influence on (i.e., dominates) the estimated position or commutation state. Accordingly, in this description, the term "startup" includes any period (even if beyond initial operation) when the angular speed (e.g., rotor speed) of the motor is below the speed threshold.

Then, the motor is controlled 1808 during startup based on the estimated angular position or commutation state. Such control can be provided by generating driving signals, e.g., PWM signals, based on the estimated angular position or commutation state.

The method 1800 can further include providing a pulse-width-modulation (PWM) driving current signal to the motor, the driving current signal comprising PWM cycles, and then sampling the voltage signals or signals derived therefrom, such as frequency-component-separated voltage signals, at respective rising edges of PWM cycles of the driving current signal (as shown, for example, in FIGS. 12 and 13). For example, as shown in FIG. 13, the phase voltage signals or the signals derived therefrom can be sampled 1802 concurrently. Also, as shown in both FIGS. 12 and 13, multiple samples of the total current signal can be sampled in a PWM cycle. A current slope can be estimated by the digital logic circuitry based on those multiple samples in the PWM cycle.

The estimate of the angular position or the commutation state of the rotor of the motor can be computed 1806 in part by modeling the variation of the voltage signals and the total current signal as a function of an inductance of the motor to provide a characterized inductance model. The method 1800 can then further include determining commutation instants from the voltage signals (or signals derived therefrom), the total current signal, and the characterized inductance model. As described in greater detail above, the inductance model can be trained using an extracted back-EMF component.

During motor startup and low speed operation in method 1800, a first commutation instant can be estimated (e.g., by the digital logic circuitry) based on determining that a computed mutual inductance voltage has exceeded a mutual inductance voltage threshold. A second commutation instant can be estimated (e.g., by the digital logic circuitry) based on determining that the angular speed of the rotor has exceeded a rotor speed threshold, estimating, with the digital logic circuitry, a second commutation instant based on determining that a computed back-EMF voltage has exceeded the voltage threshold. In this way, the method 1800 transitions from an inductance-based commutation-instant determination to a back-EMF-based commutation-instant estimation for commutation timing. The voltage threshold can be adjusted based on current measurements and a lookup table that accounts for nonlinear variation of motor inductance with current saturation.

Still further, a DC bus voltage can be increased during motor startup or responsive to determining that the angular speed of the rotor has fallen below a rotor speed threshold, thereby increasing a signal-to-noise ratio of the computed mutual inductance voltage at low motor speeds.

The systems and methods for trapezoidal control described herein can be fabricated for application in motor systems in a variety of ways. For example, the systems can be implemented, and the methods can be performed by, a driver chip that includes the voltage and current sense circuitry, coupled to a separate chip that includes a digital read-only memory (ROM) containing instructions to determine the exact rotor-stator relative position. In another example, the analog driver circuitry and the digital ROM circuitry can be combined in a single chip. In still another example, the systems could be implemented using a general-purpose microprocessor coupled to suitable analog front-end circuitry.

Systems and methods for trapezoidal control described herein enable sensorless startup under load by exploiting rotor position information not only in the back-EMF component but also in the inductance at the appropriate speed ranges. By using only motor voltages and currents to perform position sensing, the systems and methods eliminate the need to provide a board containing, for example, three Hall effect sensors, or one or more encoders, thereby freeing space for board and wiring. The disclosed and claimed systems and methods can leverage concurrent three-phase voltage sampling to obtain signals needed to estimate rotor electrical angle or, equivalently, commutation instant, for enhanced trapezoidal control without sensors and with improved low-speed performance over other sensorless approaches. The disclosed and claimed systems and methods can also provide a DC voltage boost to a PWM driving signal during startup for SNR maximization and thus still further improved low-speed control performance. The disclosed and claimed systems and methods still further can leverage lookup table characterization of control input and commutation relationships to determine commutation criteria as a function of provided current level and motor speed. The disclosed and claimed systems and methods thus provide a low-cost solution for applications such as power tools, e-bikes, by eliminating sensor and wiring costs. The systems and methods provide improved angle tracking, reliability, reduction in return and repair cost, and repeatability in stall torque as compared to another sensorless approach for trapezoidal control of BLDC motors.

In this description, the term "based on" means based at least in part on. In this description, the term "couple" or "couples" means either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. A method comprising:
obtaining measurements of voltage signals and of a total current signal from a brushless direct-current (BLDC) motor having a rotor;
determining, with processing circuitry, an angular position of the rotor or a commutation state of the motor according to a nonlinear motor model responsive to the measurements, in which the nonlinear motor model provides using a look-up table (LUT) of voltage offsets and at least one of the following as a function of current level and current slope: voltage thresholds, or zero-crossing time intervals, the determining further including
determining a floating gate voltage with respect to a neutral voltage,
determining an offset based on the total current signal and the voltage offsets of the LUT, and
adding the determined offset to the determined floating gate voltage; and
controlling, responsive to the determined angular position or the determined commutation state, the motor during a startup of the motor.

2. The method of claim 1, wherein the motor is a three-phase motor, and the voltage signals include three phase voltage signals.

3. The method of claim 1, wherein the LUT includes voltage thresholds as a function of current level and current slope, and the determining further includes:
determining a zero crossing for the commutation state; and
computing a commutation voltage threshold; based on the total current signal and the voltage thresholds of the LUT.

4. The method of claim 1, wherein the LUT includes zero-crossing time intervals as a function of current level and current slope, and the determining further includes:
determining a zero crossing for the commutation state; and
computing a time interval for commutation based on the total current signal and the zero-crossing time intervals of the LUT.

5. The method of claim 1, further comprising sampling the voltage signals and the total current signal with an analog-to-digital converter, and filtering the voltage signals with an antialiasing filter to separate the voltage signals into first components containing high-frequency signal content and second components excluding the high-frequency signal content.

6. The method of claim 1, further comprising:
providing a pulse-width-modulation (PWM) driving current signal to the motor, the driving current signal having PWM cycles; and
sampling the voltage signals at rising edges of the PWM cycles.

7. The method of claim 6, wherein:
three of the voltage signals, or three signals respectively derived therefrom, are sampled concurrently;
multiple samples of the total current signal are obtained in one of the PWM cycles; and
a current slope is determined by the processing circuitry based on the multiple samples of the total current signal.

8. The method of claim 6, wherein the LUT is generated by driving the motor with a sensor to relate a floating voltage to neutral as a function of current level and current slope.

9. The method of claim 1, further comprising transitioning from an inductance-based mode to a back-EMF-based mode for commutation timing by:
determining, during the startup, with the processing circuitry, a first commutation instant, based on determining that a computed mutual inductance voltage has exceeded a voltage threshold; and
determining, with the processing circuitry, a second commutation instant, based on determining that an angular speed of the rotor has exceeded a rotor speed threshold and that a computed back-EMF voltage has exceeded the voltage threshold.

10. The method of claim 9, wherein the voltage threshold is adjusted based on the measurement of the total current signal and the LUT that accounts for nonlinear variation of motor inductance with current saturation.

11. The method of claim 9, further comprising increasing a DC bus voltage during the startup or responsive to determining that the angular speed of the rotor has fallen below a rotor speed threshold, so as to increase a signal-to-noise ratio of the computed mutual inductance voltage when the angular speed of the rotor falls below the rotor speed threshold.

12. A system comprising:
measurement circuitry adapted to be coupled to a brushless direct-current (BLDC) motor having a rotor, the measurement circuitry configured to: measure voltage signals and a total current signal of the BLDC motor;
processing circuitry coupled to the measurement circuitry, the processing circuitry configured to determine an angular position of the rotor or a commutation state of the motor according to a nonlinear motor model responsive to the measurements, in which the nonlinear motor model provides with reference to a look-up table (LUT) of voltage offsets and at least one of the following as a function of current level and current slope: voltage thresholds, or zero-crossing time intervals, the processing circuitry further configured to:
determine a floating gate voltage with respect to a neutral voltage,
determine an offset based on the total current signal and the voltage offsets of the LUT, and
add the determined offset to the determined floating gate voltage; and
control circuitry coupled to the processing circuitry and adapted to be coupled to the BLDC motor, the control circuitry configured to provide motor control signals during a startup of the motor, responsive to the determined angular position or the determined commutation state.

13. The system of claim 12, wherein the motor is a three-phase motor, and the voltage signals include three phase voltage signals.

14. The system of claim 12, wherein the processing circuitry is configured to determine the angular position or the commutation state by determining a commutation voltage value or a current-dependent inductance value from the LUT.

15. The system of claim 12, wherein the motor is configured to be driven with pulse-width-modulation (PWM) driving current signals, the driving current signals having PWM cycles, and the system further comprises an analog filter or digital frequency filtering circuitry configured to sample the voltage signals or signals derived therefrom, at rising edges of the PWM cycles.

16. The system of claim 15, wherein:
the analog filter or the digital frequency filtering circuitry is configured to:
concurrently sample three of the voltage signals, or three signals respectively derived therefrom; and
obtain multiple samples of the total current signal in one of the PWM cycles; and
the processing circuitry is configured to determine a current slope based on the multiple samples of the total current signal.

17. The system of claim 12, wherein the LUT includes voltage thresholds as a function of current level and current slope, and wherein the processing circuitry is further configured to:
determine a zero crossing for the commutation state; and
compute a commutation voltage threshold based on the total current signal and the voltage thresholds of the LUT.

18. The system of claim 12, wherein the LUT includes zero-crossing time intervals as a function of current level and current slope, and wherein the processing circuitry is further configured to:
determine a zero crossing for the commutation state; and
compute a time interval for commutation; based on the total current signal and the zero-crossing time intervals of the LUT.

19. The system of claim 17, wherein the LUT is generated by driving the motor with a sensor to relate a floating voltage to neutral as a function of current level and current slope.

20. The system of claim 12, wherein the processing circuitry is configured to transition from an inductance-based mode to a back-EMF-based mode for commutation timing by:
during the startup, determining a first commutation instant, based on determining that a computed mutual inductance voltage has exceeded a voltage threshold; and
determining a second commutation instant, based on determining that an angular speed of the rotor has exceeded a rotor speed threshold and that a computed back-EMF voltage has exceeded the voltage threshold.

* * * * *